FIG. 3B.

INVENTORS.
John V. Davis.
Howard J. Ward.
BY
Barnes, Dickey & Pierce
ATTORNEYS.

United States Patent Office 2,990,071
Patented June 27, 1961

2,990,071
PLATING APPARATUS
John V. Davis, Grosse Pointe, and Howard J. Ward, Grosse Pointe Woods, Mich., assignors to The Udylite Corporation, Detroit, Mich., a corporation of Delaware
Filed Dec. 24, 1956, Ser. No. 630,290
10 Claims. (Cl. 214—89)

This invention relates to workpiece treating machines, and the principles of the invention are representatively embodied in a machine in which the treating operation is electroplating.

Automatic treating machines for performing extensive treating operations customarily include a plurality of rectilinearly or curvilinearly aligned treating stations with conveyor means for sequentially advancing workpiece-carrying workcarriers along that line. Each such machine normally includes a loading station at which workpieces are loaded upon the workcarriers (or at which previously loaded workcarriers are placed in the machine), as well as an unloading station which may, particularly with return-type machines, be at the same location as the loading station. The loading and unloading station or stations may be considered to define the ends of the machine, even in those machines in which the aforesaid conveyor means is in the form of a continuous loop.

In most automatic treating machines, particularly those customarily employed in electroplating, the workcarriers are advanced automatically and regularly from the loading to the unloading station, with no means being provided to permit removal of workcarriers from the machine at any point intermediate the ends without shutting down the machine's operation. Yet, the need arises on occasion to provide an additional treating operation (or a substitutional treating operation not performable by the equipment at a treating station) at some point intermediate the ends of the machine such as at a point between two of the regular treating stations. For example, in electroplating operations, it may be desirable to add an additional station or stations at which the workpieces may be buffed following one plating operation and preliminary to another treating operation. It is normally not feasible to provide auxiliary stations in the main machine to provide for such a contingency in view of the already substantial length of conventional treating machines and in view of the time wasted in transporting workpieces through such auxiliary stations if those stations are not in operation.

It is among the objects of this invention, therefore, to provide an improved means for the integration of subsidiary or auxiliary treatments, additional steps, etc., with the operation of a straight-line plating and coating machine.

It is also an object to provide a treating machine including means for integrating a subsidiary or secondary conveying system with the conveying means of the main machine to permit the shunting of carriers out of the machine at an angle to their normal direction of travel.

Another object is to provide a treating machine having a pull-out station for removing and returning workcarriers at a point intermediate the ends of the machine without interference with the regular operation of the machine.

The principles of the invention are representatively embodied in equipment associated with or forming a part of a straight-line type of plating machine including a main conveyor for sequentially advancing workpieces along a line of treating stations. The main conveyor includes a track (representatively a pair of spaced-apart parallel rails) adapted to support wheeled workcarriers, and a transferring mechanism for indexing the workcarriers along the track. To facilitate the selective movement of workcarriers, or of a series of workcarriers, from and to the main conveyor, the track, in the preferred arrangement, is sectionalized, at least to the degree of providing one portion or section of the track which can be moved relative to the remainder of the track.

A secondary conveyor is disposed adjacent the main conveyor, but serves to move workcarriers over a course other than that of the main conveyor. This secondary conveyor includes a workcarrier-supporting track and motive means for advancing the workcarriers along the track. To facilitate the selective movement of workcarriers to and from the secondary conveyor, its track is similarly segmentalized to the extent that one section thereof can be moved relative to the remainder of that track. In the preferred arrangement, a single such movable track section is common to both conveyors, being movable between one position in which it is aligned with the main conveyor track and another position in which it is aligned with the secondary conveyor track. To support the track section during movement, it is mounted upon a wheeled carriage which rides on an auxiliary track. While that carriage may move in a vertical sense to transfer workcarriers between the two conveyors, it is representatively and preferably arranged for horizontal translational motion, moving the workcarriers transversely of the main conveyor line. It is also advantageous to move the workcarriers transversely of the secondary conveyor, or, at least, transversely of the leg or course of that secondary conveyor into which the workcarriers are moved.

In the illustrated arrangement, the secondary conveyor comprises horizontally disposed upper and lower, vertically aligned conveyor courses, with elevators being provided at each end to transfer workcarriers between those courses.

At the time that the workcarriers are advanced, in an indexing motion, on the main conveyor, the transfer carriage or pull-out cart which supports the laterally translatable track section is in alignment with the main-conveyor track. As a result of that indexing, a workcarrier is advanced from the laterally translatable track section to a succeeding portion of the main-conveyor track and another workcarrier is advanced from a preceding portion of the main-conveyor track to the laterally translatable track section. After insuring that the main-conveyor mechanism is clear of the workcarrier, the track-supporting carrier is moved from the main machine and into position, representatively at a point in the upper course, in the secondary conveyor. That conveyor removes the workcarrier from the track section by shifting it along the upper conveyor course, and concurrently, another workpiece, having traveled the secondary conveyor loop, is placed upon the movable track section. Before the next indexing movement of the main machine, the movable track section is returned to the main machine in alignment with the track thereof. Consequently, there is no interference with the operation of the main machine, one workcarrier merely having been substituted for another in that machine during an inter-indexing period of the main machine's operation.

In this manner, with the pull-out equipment including the secondary conveyor in operation, the workpieces advancing down the treating line of the main machine will be removed from the machine in sequence, advanced along the upper secondary conveyor course, lowered, transferred along the lower course of the secondary conveyor, elevated, and transferred along the upper course of the secondary conveyor, deposited upon the laterally movable track section, and returned to the main machine without loss of the workpiece sequence. Means are provided for obtaining proper synchronization of these several movements and of the movements of the main machine, and the equipment is also arranged to insure that there will be no interference between the returning workcarriers and the main-conveyor advancing mechanism. The additional treating operation, such as buffing, may be performed during the movement of the parts along the lower course, or, if preferred, the parts may be removed from and replaced upon the carriers during that portion of their travel, the parts being treated at a location away from the conveyor.

The manner of accomplishing the foregoing objects, and other objects and features of the invention, will be more fully understood from the following detailed description of an embodiment of the invention when read with reference to the accompanying drawings in which:

FIGS. 3A and 3B are elevational views of certain of the mechanical elements of the pull-out station, being taken in the direction of the arrow 3 in FIG. 2; FIG. 3B being placed to the right of FIG. 3A to provide a continuous view;

The disclosed embodiment of the invention is intended to be associated with and to form a part of an automatic treating machine such as a straight-line automatic plating machine which may be and is here assumed to be of the general type disclosed in U.S. Patent 2,716,415, issued August 30, 1955, or in the patent application of John V. Davis entitled Plating Machine, Serial No. 530,223, now Patent 2,789,569, granted April 23, 1957, and the disclosure of that patent and application are incorporated herein by reference.

Figure 1:
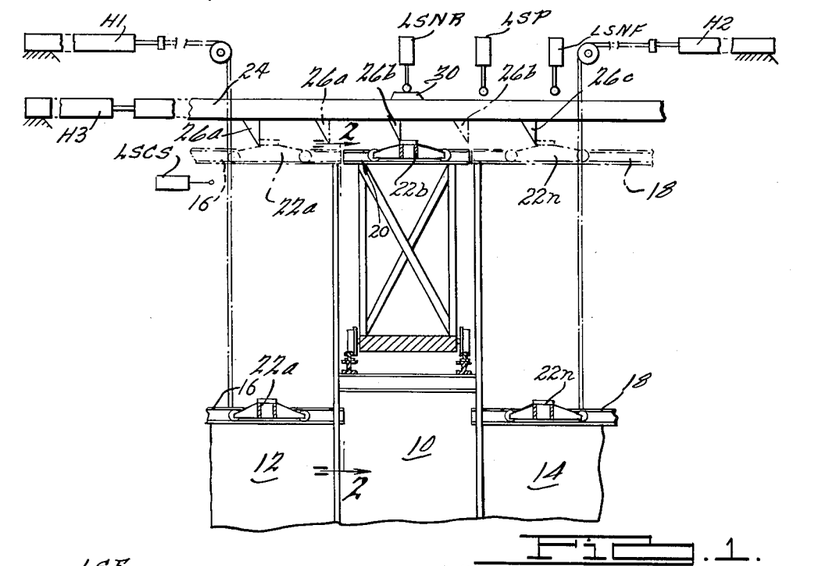
FIGURE 1 is a diagrammatic illustration of the relationship between a pull-out station embodying the principles of the present invention and elements of an automatic straight-line treating machines, the diagrammatic view being taken in vertical section through a portion of the straight-line machine.

A portion of a system of that type is represented in FIG. 1 of the drawings, the illustration being but diagrammatic for purposes of clarity. In general, such machines include a track comprising a pair of parallel, spaced-apart, horizontally disposed rails. The workpieces are loaded on carriers in the form of dollies with depending workpiece racks, each dolly having one or more wheels riding upon each of the rails.

The track overlies a plurality of serially aligned treating stations or cells all or some of which include tanks into which the workcarriers are to be lowered. To facilitate selective raising and lowering, the track may be segmentalized, with the several sections being adapted to be moved in a vertical sense individually, as a group, or as sub-groups between an upper position, in which the workcarriers will clear the tanks during horizontal movement, and a lower position in which the workpieces are immersed in the tank solutions.

In the simplified arranged illustrated in FIG. 1, a pull-out station 10 is interposed two treating stations 12 and 14 of such a straight-line automatic treating apparatus. Track section 16, all or a portion of which overlies station 12, and track section 18, all or a portion of which overlies station 14, are both assumed to be movable, by motive means such as by chains driven by hydraulic cylinders H1 and H2 or, preferably, by mechanisms such as that detailed in the above-identified patents, between lower positions, in which they are illustrated, and upper positions, represented in phantom, those track sections moving concurrently and in phase. The track section 20 at the pull-out station 10 is fixed, in a vertical sense, in exact alignment with track sections 16 and 18 when those sections are in their upper positions. Workcarriers 22a, 22b and 22n are shown at stations 12, 10 and 14, respectively, the depending rack portions thereof being omitted in each of the FIGURES 1 to 3 in which workcarriers are illustrated.

The workcarriers are transported in a horizontal sense and from station to station by means of a transfer mechanism representatively shown as a reciprocating bar or bars 24 carrying a plurality of pushers 26a, 26b and 26c spaced the station increment apart and adapted to engage the workcarriers and move them from left to right in the FIG. 1 representation. If desired, suitable stop elements may be secured to the bar or bars 24 to the right of the individual pushers an appropriate distance to limit overtravel of the workcarriers when forward motion of the bar or bars 24 is terminated. Transfer bar 24 is shown in its left-most, returned or retracted position, and pushers 26b and 26c are also illustrated, in phantom, in intermediate positions which they will assume under conditions hereinafter to be described.

To co-ordinate the operations of equipment of the noted general nature, all of the major elements are operated on a cyclic basis, all cycles being of the same duration and being divided into first and second periods. Each of those equipments is arranged to have completed a phase of its operations prior to the termination of each of those periods and customarily the length of the period is slightly longer than the time required for any of the equipments to complete that phase to make certain that all elements of the system are in condition to proceed with the next succeeding phase of operation. At the beginning of the first period of the cycle, the track sections 16 and 18 are moved upwardly, carrying workcarriers 22a and 22n therewith (as well as other workcarriers not shown). When those track sections reach their upper positions, as illustrated in phantom, the motion is stopped, means normally being provided to positively restrain those track sections against downward motion. The arrival at the upper position of track sections 16 and 18 initiates the transfer operation, bar or bars 24 being moved in translation to the right, carrying all of the pushers therewith, by suitable means such as hydraulic cylinder H3, or the advance of the workcarriers may be accomplished by means of the equipments disclosed in the above-identified patents. As a result, the workcarriers are advanced one station interval to the right, workcarrier 22a occupying the position in which workcarrier 22b is illustrated, workcarrier 22b moving to occupy the position of workcarrier 22n, carrier 22n moving to the right to the next station, and a new workcarrier entering station 12 from the left. At the termination of forward motion of the workcarriers, signaled by the tripping of limit switch LSNF by cam 30, downward motion of track sections 16 and 18 is initiated.

In the customary practice, as soon as track sections 16 and 18 have moved down but a short distance, the return motion of the transfer bar 24 is initiated. In the showing of FIG. 1 the initiating signal is derived from the tripping of limit switch LSCS which is here assumed, for simplicity, to be of a toggle action type, being tripped by downward motion of the track sections, and mechanically remaining in that state until restored as a result of the upward motion of the track sections. In the illustrated arrangement, return motion of the transfer bar is not completed, the bar 24 moving leftwardly but a portion of the station interval, moving pushers 26a and 26b from their advanced positions only back to the positions illustrated in phantom. The arrival of the transfer bar 24 at this intermediate position during its return stroke is signaled by cam 30 tripping limit switch LSP. This actuation of limit switch LSP not only terminates this portion of the return stroke of transfer bar 24 but also serves as a signal to initiate a phase of the operation of the pull-out station 10 when that station is energized.

The track sections 16 and 18 continue their downward motion until they arrive at their illustrated positions, and the equipment then remains static until the aforesaid first time period has elapsed. At the termination of that period and therefore at the beginning of the second timing period, means are actuated for moving transfer bar 24 through the remainder of its return stroke and back to its illustrated position, as signaled by engagement between cam 30 and limit switch LSNR. The equipment then remains in that condition, with the workpieces immersed in the tank solutions, until the termination of the second time period in the cycle and the commencement of the next cycle of operation.

If the pull-out station 10 is placed in operation, the operation of the machine proceeds as above described except that during the interlude between the return of the transfer bar 24 to the intermediate position and the time at which the next cycle of operation is initiated, the pull-out station equipment operates to substitute a different workcarrier for workcarrier 22b. The equipment at the pull-out station 10 in essence constitutes an ancillary conveyor system for routing the successive workcarriers received from station 12 first laterally of the machine then over a course permitting other operations to be performed on the workpieces and then back into the line of main equipment to the position in which workcarrier 22b is illustrated. However, the workcarriers are taken from and returned to the machine in step with the indexing of the machine so that all workcarriers are taken from the machine in order, transported through the auxiliary conveyor system, and returned to the machine in the same order and sequence.

Figure 3A:
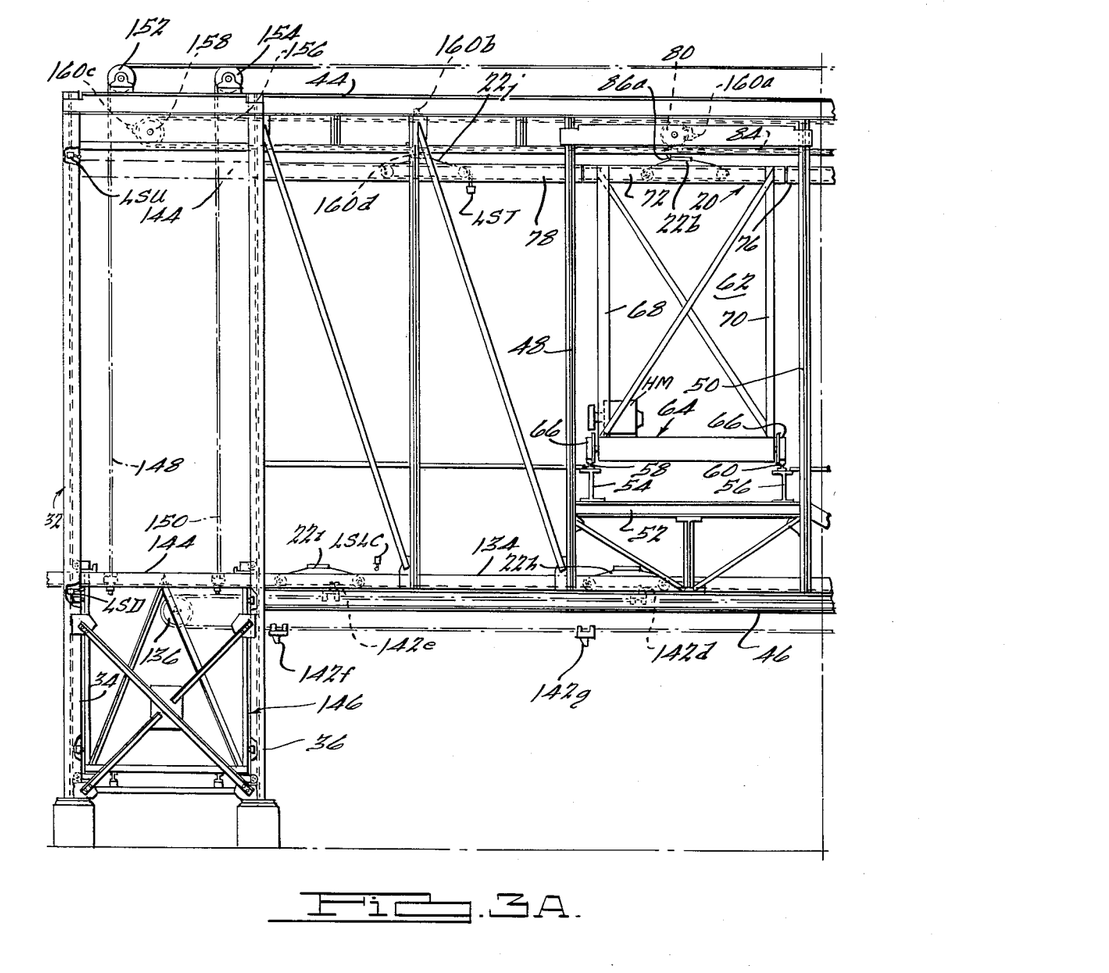
Figure 3B:
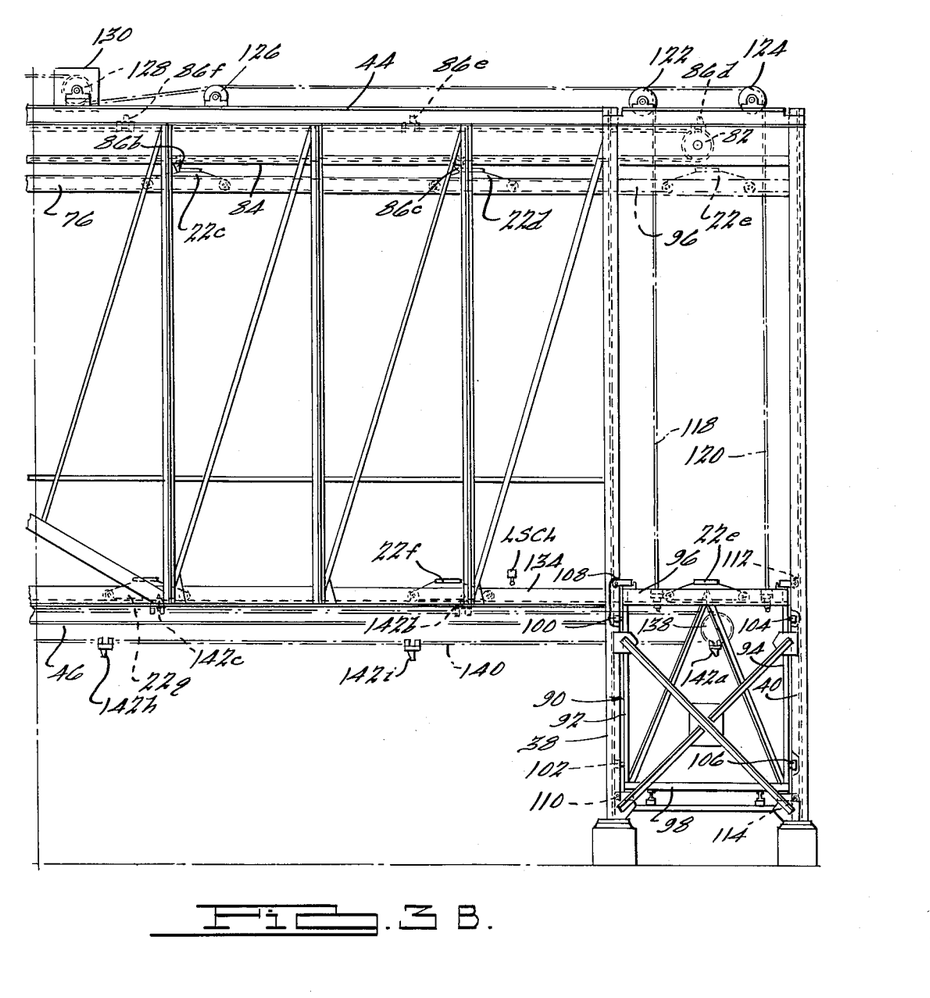

The equipment illustrated in the elevational view of FIGS. 3A and 3B includes a framework 32 disposed in spaced parallelism with and at the rear or far side of the main straight-line machine in the view of FIG. 1.

The framework 32 is mounted on two rows of pier-supported columns lying in spaced parallelism with one another and with the longitudinal axis of the plating machine. The outer row includes columns 34, 36, 38 and 40, illustrated in FIGS. 3A and 3B, while the inner row, more proximate the machine, consists of an equal number of columns. The columns 34, 36, 38 and 40 are interjoined at their upper ends by upper longitudinal 44 while lower longitudinal 46 interjoins columns 36 and 38. The columns in the other row are similarly interconnected, and transverse structural members are preferably provided interjoining each transversely aligned pair of columns. A plurality of uprights, including uprights 48 and 50, extend between and are secured to the upper and lower longitudinals at each side of the machine, and additional bracing is provided to insure structural rigidity. A trussed girder 52, extending between uprights 48 and 50, supports, in cooperation with corresponding girders at the other side of the framework 32 and in the machine, a pair of transverse beams 54 and 56 which extends the width of the framework 32 and the width of the plating machine and spans the space between that machine and framework. Rails 58 and 60, mounted on and co-extensive with beams 54 and 56, respectively, constitute a transverse track upon and along which a wheeled cart 62 may be moved.

Cart 62 comprises a horizontally disposed generally rectangular base frame 64 supporting both the wheels 66 and, at each corner, an upright such as uprights 68 and 70 at the end of the cart which is visible in FIG. 3A. While the two uprights at each end, such as uprights 68 and 70, may be inter-braced, the sides of the machine are left clear of structural members so that the workcarriers may be moved transversely of the cart along a line parallel with the longitudinal axis of the plating machine in a manner hereinafter to be described. Uprights 68 and 70 support a horizontally disposed channel 72, and a corresponding channel 74 (FIG. 2) is supported by the uprights at the other end of the cart. These channels 72 and 74 are the rails which constitute the track section 20 represented in FIG. 1 of the drawings. When the cart is in the machine, in the position illustrated in solid lines in FIG. 2, rails 72 and 74 are in alignment with the rails constituting track sections 16 and 18 when those track sections are in their upper positions.

Figure 2:
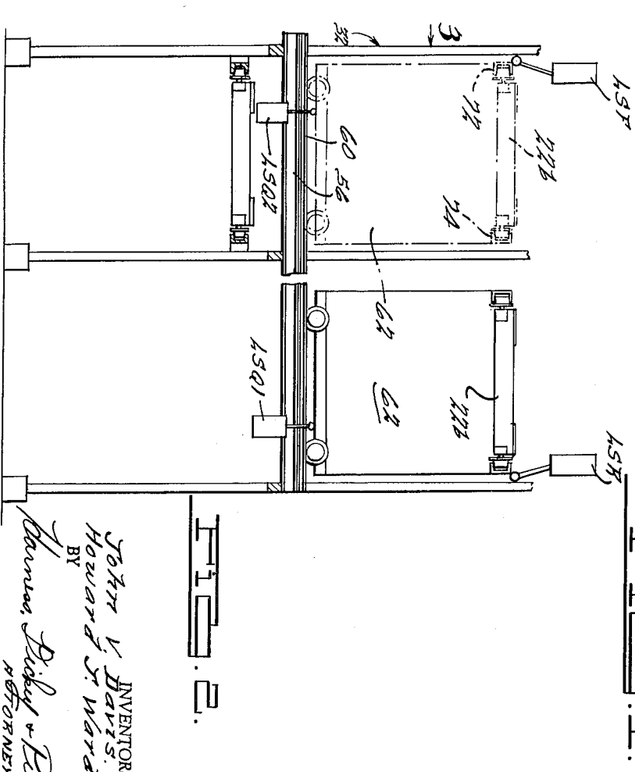
FIG. 2 is a fragmentary sectional view taken substantially along the line 2—2 of FIG. 1 illustrating, in diagrammatic form, a moving element of the pull-out station equipment both in a position in alignment with the elements of the straight-line machine and in a position out of alignment with those elements, the figure being intended primarily to represent the location of certain limit switches sensing the position of that movable element.

When a workcarrier, such as workcarrier 22b, has been placed upon the rails 72 and 74 and when the proper point in the operating cycle of the straight-line machine occurs, motive means are actuated for rolling the cart 62 from its inboard position illustrated in solid lines in FIG. 2 to its outboard position illustrated in phantom in FIG. 2. This motive means may be of any suitable nature. In the disclosed embodiment, it is assumed that a hydraulic system is utilized to drive the cart 62 forwardly out of the plating machine and to return that cart to the plating machine, that hydraulic system including a hydraulic motor mechanically coupled to the cart, a hydraulic pump, and a solenoid-controlled hydraulic valve system controlling the motor. The hydraulic motor HM is illustrated in frictional driving relation with one of the wheels on the cart 62 in FIG. 3A of the drawings. It is further assumed that the hydraulic control valve system is of a conventional, commercially available form in which the operation of one or the other of two solenoids controls whether the motor will move forwardly or reversely, the operation of either of those solenoids producing but a minimum hydraulic pressure on the motor and serving primarily but to exert a continuing force maintaining the cart in a selected limit position, in which a third solenoid so controls a vent as to, in conjunction with either of the first two solenoids, cause the cart to be moved in the appropriate and selected direction at a slow or creep speed, and in which a fourth solenoid is actuatable to cause the cart to be driven in the selected direction at a rapid speed.

When the cart has been brought to its outboard limit position as established by an appropriate mechanical stop, the channels or rails 72 and 74 are in alignment with rails mounted upon framework 32. Thus, rail 72 is alignable with a channel-section rail 76 extending from a point just to the left of upright 50 (FIG. 3A) to column 38 (FIG. 3B), being supported upon those vertically disposed elements and upon the other intermediate uprights. Similarly, a channel-section rail 78 extends from a point just to the right of upright 48 to column 36 and is similarly secured to the supporting uprights.

The workcarriers are advanced from the position in which workcarrier 22b is illustrated to the right, in the view of FIGS. 3A and 3B, in a stepwise fashion by means of an upper conveyor section including sprockets 80 and 82 and conveyor chain 84 riding on sprockets 80 and 82 and carrying driving pawls or pushers 86a to 86f. One of the sprockets, such as sprocket 80, is, under appropriate conditions, driven by any suitable means. It is again assumed that the upper conveyor system is actuated by a hydraulic mechanism controlled by a single solenoid, actuation of that solenoid producing counterclockwise rotation of drive sprocket 80 and deenergization of that solenoid terminating the driving of the sprocket and hence of the conveyor section including chain 84.

As each workcarrier is indexed along the track 76, it will successively occupy the positions in which carriers 22b, 22c, 22d and 22e are illustrated, the latter of which is in position upon a down elevator 90.

Elevator 90 is adapted to be moved in vertical translation in a shaft defined by the columns 38 and 40 and by the corresponding columns on the other side of the framework 32. The elevator includes an end frame comprising uprights 92 and 94, top and bottom horizontals 96 and 98, and appropriate interbracing. The end of the elevator 90 nearest the plating machine is similarly conformed. Rollers 100 and 102 engage the near, right-hand flange of the I-beam column 38 and additional rollers, mounted adjacent rollers 100 and 102, engage the far, right-hand flange of I-beam 38. Other pairs of rollers, including rollers 104 and 106, engage the inner-faces of the left-hand flanges of I-beam column 40. Rollers 108 and 110, secured to the elevator framework, engage the right-hand web face of column 38 while rollers 112 and 114 similarly engage the left-hand web face of column 40. Similar rollers are provided at the other end of the elevator.

The two parallel, horizontally disposed elevator frame members including member 96 are illustrated as additionally serving as workcarrier rails, although in practice separate channel-section rails may be utilized. Four cables or chains, including cables or chains 118 and 120, are secured to the framework of the elevator 90, trained over pulleys or sprockets including pulleys or sprockets 122 and 124 and over idlers including idler 126, and are passed clockwise around and are secured to a drum or sprocket 128. Drum or sprocket 128 is selectively driveable in a clockwise or counter-clockwise direction by an elevator drive mechanism 130 of any appropriate form. It is assumed that that drive mechanism operates on a hydraulic basis and that it may include a synchronizing and equalizing means to insure that elevator 90 and the other system elevator, to be described, move in unison. As will subsequently be described, it is further assumed that the hydraulic system includes valve means controlled by three solenoids the operation of one of which permits both elevator 90 and the other elevator in the system to be lowered, the operation of the other two solenoids causing the elevators to be raised, and the energization of but one of the other two solenoids causing a continuous hydraulic force to be exerted to maintain the elevators in their up position.

When elevator 90 is in its up position, the track including rail 96 is in alignment with the track including rail 76 (as illustrated in phantom) so that the workcarriers may be advanced by the upper horizontal conveyor system from the track including rail 76 to the track including rail 96.

In the lower position of elevator 90, as established by appropriate mechanical stops, the track including rail 96 is in alignment with a track including a channel-section rail 134 extending between columns 36 and 38, a corresponding rail being provided on the other side of the machine. The successive workcarriers are moved in horizontal translation from right to left in the view of FIGS. 3A and 3B upon the track including rail 134. The transporting means includes sprockets 136 and 138 carrying a conveyor chain 140 bearing a plurality of spaced-apart pushers 142a to 142i.

It is assumed, in the disclosed arrangement, that the lower conveyor is, for convenience during the work operations, moved continuously so that sprocket or pulley 136 or 138 is driven by an electric motor at a constant speed interrupted only under trouble conditions or in the event of termination of the operation of the pull-out section. The number of pushers 142, the spacing of those pushers and the speed of rotation of the pulleys or sprockets 136 and 138 is selected in coordination with the operating cycle period so that one of the pushers 142 will be suitably located to pick up the work-carrier shortly after the elevator 90 reaches its down position. This condition is illustrated in FIG. 3B of the drawings in which pusher 142a is in a position to pass around pulley or sprockets 138 and engage work-carrier 22e.

As the workpieces are transported from right to left along the track including rail 134, any desired work operation may be performed thereon. The track including rail 134 is longitudinally alignable with a second elevator track including rail 144, a constituent element of an up elevator assembly 146 which is or may be identical to down elevator 90. Elevator 146 is supported and lifted by cables or chains including those designated 148 and 150 which pass over pulleys or sprockets 152 and 154 and clockwise around pulley or sprocket 128, being secured thereto. Consequently, elevators 90 and 146 will move upwardly and downwardly in unison with one another. In the determination of the rate of speed of the drive motor for the lower conveyor, and the number and spacing of the pushers 142, it is also established as a design condition that the workcarrier is to be moved to and left upon the track including rail section 144, while the elevator 146 is down. Thus, under the illustrated conditions, elevator 146 is at its bottom limit position and pusher 142e is in position to move workcarrier 22i from the track including rail 134 to the elevator track including rail 144.

When elevator 146 is elevated, its track, including rail 144 is in alignment with the track including rail 78. A second upper conveyor system is provided to transport the workcarriers from left to right in the view of FIG. 3A from the up elevator 146. This conveyor includes a chain 156 trained around sprockets 158 and 80 and carrying a plurality, representatively four, of pushers 160a to 160d. This left-hand upper conveyor mechanism moves concurrently and in phase with the upper right-hand conveyor mechanism, transporting the workcarriers incrementally from left to right from the elevator track, over the track including rail 78 and on to the cart track 20 including rail 72, and in position to be transported upon the cart 62 back into the plating machine.

Control of the operation of the pull-out station equipment is established through means including a series of limit switches. As is illustrated in FIGURE 2, a limit switch LSR is disposed to close its normally-open contacts whenever the cart 62 is in the plating machine, and to be released as the cart moves from the machine, limit switch LSQ1, representatively of the plunger type, is so located as to engage a portion of the cart 62 and to be released to open its normally-closed set of contacts when the cart 62 has moved a short distance on its way from the plating machine, and limit switch LSQ2 is positioned so that it will open its normally-closed contacts when the cart 62 reaches a point, in its outward motion from the machine, near the limit position of the cart's outward movement, and so that it will again close its contacts when the cart 62 has moved a short distance from its outboard position towards the machine during its return motion. Limit switch LSF is positioned to sense when the cart 62 is at its outboard limit position, fully out of the machine, closing its normally-open contacts when that condition occurs. In the view of FIGURE 3A, limit switch LSU is positioned so that its normally-open contacts will be closed when the up elevator 146 arrives at its upper limit position, and limit switch LSD is located so that its normally-open contacts will be closed when the elevator 146 reaches its full down position. These signals will also represent the condition of elevator 90 since elevators 90 and 146 operate in phase. However, if desired, additional limit switches may be connected, for safety, to sense the position of elevator 90. The operation of the two upper conveyors is sensed and controlled by a limit switch LST representatively positioned near the left end of the left upper conveyor and engageable by a pusher or workcarrier to close its normally-open contacts. Limit switch LSCL is disposed in a position to be tripped by a pusher on chain 140 to signal that the workcarrier moved thereby and traveling from the down elevator 90 to the left on the track including rail 134 has been moved clear of the elevator, indicating, by the closure of its normally-open contacts that it is safe to raise the elevator 90. Similarly, limit switch LSLC is positioned to sense whether it is safe to raise elevator 146, the opening of the normally-closed contacts of that limit switch indicating that a workcarrier is in such a position that it would reach the up elevator 146 other than when that elevator is fully down if operations were permitted to proceed.

Figure 4:
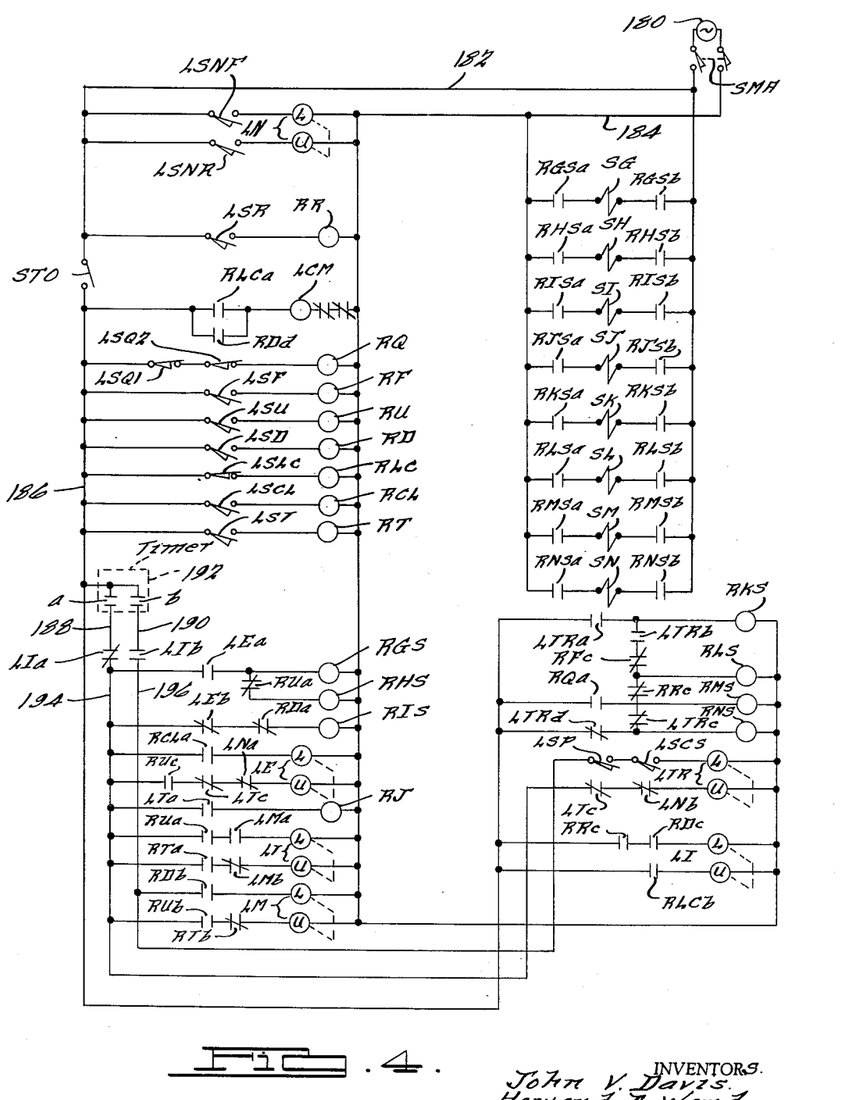
FIG. 4 is a schematic representation of a suitable electrical circuit for controlling the operation of the equipment of FIGS. 3A and 3B.
Figure 5:
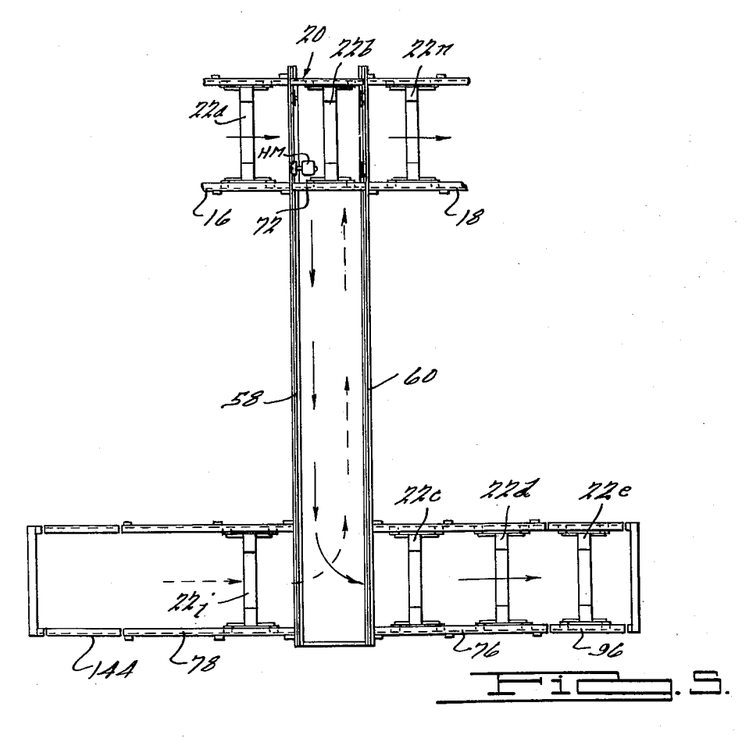
FIG. 5 is a diagrammatic plan view of the pull-out station and of a portion of the straight-line machine intended to illustrate the relationship of the pull-out station to the straight-line machine.

In the schematic representation of appropriate control circuitry depicted in FIG. 4 of the drawings, electromagnetic relays are designated by a general symbol applied to the circles representing the relay winding, with the contacts individual to and controlled by that winding being designated with a similar symbol suffixed by a distinguishing lower-case letter. A mechanically latching relay is represented by a pair of spaced-apart circles, representing the two windings of such a relay, with a mechanical ganging representation interconnecting those two circles. The mechanically latching relay is identified with a single reference character, such as reference character LE, and the individual windings are further discretely identified by the letter L applied to the latching, operating or energizing winding and the letter U applied to the releasing or unlatching winding.

The voltage of source 180 is applied between conductors 182 and 184 upon the closure of the main switch SMA, while the potential at conductor 182 is applied to conductor 186 upon the closure of switch STO, that switch being closed whenever it is desired to place the pull-out station equipment in operation.

The potential on conductor 186 is additionally alternately applied to conductors 188 and 190 under the control of timer 192. Timer 192 is provided with contacts labeled $a$ and $b$ and, in addition, with other contacts (not shown) coordinating both the total cycle time and the two individual sub-cycle periods, before noted, for the entire equipment including the plating machine and the pull-out unit. Timer 192 opens its contact $a$ and closes its contact $b$ during the first sub-cycle period and closes its contact $a$ and opens its contact $b$ to define the second cycle period.

Since latching relay LI is operated during the second timing period, as will be noted, the energization of conductor 190 at the beginning of the first timing period in each cycle wll result in enregization of conductor 196 since contacts LI$b$ are closed. Additionally, at the beginning of the first timing period, the pull-out cart 62 is in its fully returned position, the plating machine track sections 16 and 18 are down, and the transfer mechanism 24 is fully returned. With the pull-out cart 62 and the transfer mechanism 24 in their fully returned position, limit switches LSR and LSNR are actuated so that their normally open contacts are closed, the former of which completes an energizing circuit for relay RR (FIG. 4), the latter of which unlatches mechanically latching relay LN.

At the initiation of the first timing period in each cycle, the hydraulic mechanism for moving the plating machine track sections 16 and 18 upwardly is energized, the operated state of relay RR preferably being imposed as a condition precedent to that energization. Near the upper limit of that motion, limit switch LSCS is tripped open in preparation for subsequent re-operation.

At the end of the upward motion of the track sections 16 and 18, a limit switch is tripped which will initiate forward motion of the transfer mechanism 24 (FIG. 1). As transfer bar 24 moves forwardly, cam 30 will be translated first to release limit switch LSNR to deenergize the unlatching circuit of relay LN, and then into a position to actuate limit switch LSNF which, upon closing its normally-open contacts, will energize winding L of latching relay LN to operate that relay. The operation of relay LN opens a normally-closed contact in series with the solenoid (not shown) which controls the hydraulic drive means including cylinder H3 for the transfer bar 24, stopping forward motion of that bar. The forwardmost position of transfer bar 24 is such that the workcarrier, such as workcarrier 22$b$ (FIG. 3A) is centered upon the cart 62, as illustrated.

The arrival of the transfer bar at its forward position also initiates the downward motion of the plating machine tracks 16 and 18 and after those tracks have moved downwardly sufficiently to clear the workcarriers of the pushers 26, as sensed by the tripping of limit switch LSCS and the closure of one set of controls (not shown) thereof, the hydraulic drive means for the transfer bar 24 are actuated to start the return motion of that bar. When cam 30 trips limit switch LSP, one contact of that limit switch (or a contact of a relay controlled thereby) interrupts the return movement of transfer bar 24, stopping that motion at a point between the full forward and the full return positions of the transfer bar and insuring that the pusher 26$a$, in its phantom position, will clear the workcarrier when that workcarrier is moved transversely of the machine by the cart 62. Since limit switch LSCS is tripped, as above noted, the contacts thereof illustrated in FIG. 4 are closed so that the closure of the contacts of limit switch LSP illustrated in FIG. 4 completes an energizing circuit for winding L of latching relay LTR to operate that relay and thereby to initiate operation of the pull-out station in a manner to be described.

Upon the operation of mechanically latching relay LTR, contacts LTR$a$ are closed to operate relay RKS which closes its contacts RKS$a$ and RKS$b$ to energize solenoid SK. Additionally, since relay RF is released at this time, relay RLS is operated over a circuit including contacts LTR$a$, LTR$b$ and RF$c$, closing its contacts RLS$a$ and RLS$b$ to energize deventing solenoid SL. Solenoids SK and SL control the hydraulic apparatus including motor HM for moving the cart 62 from the plating machine, the concurrent energization of those solenoids producing movement of the cart 62 from the machine at a relatively slow speed. When the cart 62 has moved a short distance, limit switch LSR (FIG. 2) is released to release relay RR.

When the cart 62 (FIG. 2) has advanced somewhat further in its outward motion, it will clear limit switch LSQ1, releasing that limit switch and permitting it to close its normally-closed contacts. Since the cart 62 is not yet in engagement with limit switch LSQ2, the normally-closed contacts of that limit switch are also now closed, completing an energizing circuit for relay RQ. Relay RMS is operated as a result of the closure of contacts RQ$a$, closing its contacts RMS$a$ and RMS$b$ to energize solenoid SM. Solenoid SM also controls the cart transfer hydraulic motive means, causing the outward motion of the cart to increase to a maximum velocity.

This outward motion of cart 62 continues for the duration of the first timing period and into the first portion of the second timing period, engagement of cart 62 with limit switch LSQ2 releasing relay RQ which releases relay RMS and therefore solenoid SM to reduce the velocity of cart motion. When cart 62 reaches its outboard position, it trips limit switch LSF which operates relay RF, opening contacts RF$c$ and thereby releasing relay RLS. The release of relay RLS releases solenoid SL so that only control solenoid SK will remain operated, the hydraulic driving equipment then exerting but sufficient hydraulic pressure to maintain the cart against the outboard mechanical stop.

As previously noted, the lower conveyor is electrically driven and normally runs continuously since normally either relay RLC is operated, with its contacts RLC$a$ closed or relay RD is operated, with its contacts RD$d$ closed, either of which conditions results in the operation of relay LCM which controls the contactor of the electric motor for the lower conveyor. If, however, due to any malfunctioning of the equipment or the controls, the up elevator 146 starts up, releasing limit switch LSD to release relay RD, but the workcarrier has not yet entered the elevator and cleared limit switch LSLC so that relay RLC is also released, relay LCM will be released and the motion of the lower conveyor will be terminated until the condition is rectified.

The continuous movement of the lower conveyor is so keyed to the operation of the other equipment that, concurrently with the above described motion of the cart 62 and during the first timing period, the lower conveyor removes the next workpiece, illustrated as workpiece 22e, from the down elevator 90 and places the workcarrier 22i upon the up elevator 146. During the course of this movement, limit switch LSCL is actuated by a pusher on the lower conveyor moving that workcarrier, to close its normally-open contacts, operating relay RCL to signal that the workcarrier has cleared the down elevator 90. The closure of contact RCLa latches relay LE. During the time that the pusher 142e, engaging workcarrier 22i, is in engagement with limit switch LSLC, the contacts of that limit switch are open and relay RLC is released, a condition which exists during the operated period of relay RCL. When the workcarrier 22i has been moved into the up elevator 146, limit switch LSLC is released, operating relay RLC. The resultant closure of contacts RLCb switches latching relay LI to its unlatched condition, connecting conductor 188 to conductor 194 and disconnecting conductor 190 from conductor 196. This transfer occurs prior to the end of the first timing interval so that the connection of conductor 188 to conductor 194 does not at this time energize conductor 194. The deenergization of conductor 196 produces no operational change since only mechanically latching relays are connected thereto.

When timer 192 signals the beginning of the second time period by opening its contact b and closing its contact a, conductor 194 is energized since contacts LIa are closed, as above noted. As a result, relay RGS is energized through contacts LEa and relay RHS is also energized since contacts RUa are closed at this time. Relays RGS and RHS close their contacts to energize solenoids SG and SH and those solenoids, operated concurrently, cause the hydraulic lifting mechanism associated with the elevators 90 and 146 to raise those elevators concurrently and rapidly. This motion continues until the attainment of the up position by elevator 146 trips limit switch LSU (FIG. 6), closing the normally-open contacts of that limit switch, and operating relay RU to open contacts RUa. As a result, relay RHS is released and solenoid SH is deenergized. With solenoid SG alone energized, a reduced pressure is applied by the hydraulic system to maintain the elevators 90 and 146 in their upper positions, as established by mechanical stops.

Since elevators 90 and 146 were down during the first timing period and since conductor 196 was energized during the major portion of that period, the requisite conditions existed to produce energization of the latching winding L of mechanically latching relay LM, and the termination of the first timing period and the initiation of the second timing period has done nothing to change the state of that relay. Consequently, upon the operation of relay RU, as the result of the elevators reaching their upper position, a circuit is completed from now-energized conductor 194 through contacts RUa and LMa to energize the latching winding L of mechanically latching relay LT. Relay LT, in operating, closes its contacts LTa to operate relay RJ, closing contacts RJa and RJb to energize solenoid SJ. Solenoid SJ controls the hydraulic mechanism which rotates sprocket 80, advancing both of the upper conveyors.

When pusher 160d, driving workcarrier 22j moves to the right adequately to release limit switch LST, the normally-open contacts of that switch are opened and relay RT releases, closing its normally-closed contacts RTb. Since relay RU is operated at this time, as above noted, its contacts RUb are closed and an energizing circuit is completed for the unlatching winding U of mechanically latching relay LM, so that its normally-closed contacts LMb become closed at this juncture. The workcarriers at the upper conveyor continue to be translated to the right until the next succeeding pusher (here, pusher 160c) strikes limit switch LST, again closing that limit switch and reoperating relay RT. This not only interrupts the unlatching circuit for mechanically latching relay LM by opening contacts RTb but also closes contacts RTa to complete an unlatching circuit for latching relay LT, contacts LMb being now closed. The resultant opening of contacts LTa releases relay RJ and deenergizes solenoid SJ, terminating motion of the upper conveyors.

It will be observed that pusher 160a is illustrated, in FIG. 3A, in the position which each of the pushers on chain 156 will assume at the ends of the successive incremental movements of that chain. By not terminating chain movement until the pusher has advanced part of the way around sprocket 80, the workcarrier, moved from track 78 to track 72, is deposited on cart 62 to the right (in the view of FIG. 3A) of the center line thereof. Movement of the workcarrier onto cart 62 will be terminated not because the chain 156 stops, but because the advancing pusher is lifted from engagement therewith as that pusher commences to circle sprocket 80. The importance of this arrangement derives from the fact that the transfer bar 24 is fully returned at the time when cart 62 is moved back into the main machine. Consequently, by providing for the workcarrier to be positioned a few inches ahead of the center line of cart 62, it is ensured that the workcarrier will not strike a transfer-bar pusher during the return movement of cart 62.

As a result of those operations, each of the workcarriers in the upper position has been indexed one position, workcarrier 22j being moved onto track 20 integral with cart 62. Additionally, workcarrier 22i, which was moved onto elevator 146 and transported upwardly thereby, now occupies the position in which workcarrier 22j is illustrated and workcarrier 22d has been moved from the track including rail 76 onto the track including rail 96, that is, onto down elevator 90.

The completion of the return motion of the transfer bar 24 on the main plating machine is not initiated at least until cart 62 is completely clear of the machine, and, in the preferred practice, is not instituted until limit switch LSF (FIG. 2) is tripped. As a result, the full return movement concurs in point of time with the described indexing of the workcarriers in the upper position in the pull-out equipment. Upon the completion of that return, limit switch LSNR (FIG. 1) is tripped to unlatch relay LN (FIG. 3), closing contacts LNa. Since relay RU was operated at the end of the upward motion of the elevators 90 and 146, as described, its contacts RUc are closed. Therefore, upon the above-described release of relay LT, at the end of the motion of the upper conveyors at the pull-out station, a circuit is completed through contacts RUc, LTc and LNa for unlatching relay LE. The resultant opening of contacts LEa releases relay RGS and consequently deenergizes solenoid SG. Simultaneously, the closure of contacts LEb energizes relay RIS (contact RDa being closed at this point since the elevators are not down) to energize solenoid SI. The deenergization of solenoid SG relieves the hydraulic pressure tending to retain the elevators 90 and 146 in their upper position and the energization of solenoid SI causes the hydraulic elevator driving mechanism to move the elevators 90 and 146 downwardly. This downward motion continues until limit switch LSD is tripped when elevator 146 reaches its down position, operating relay RD to open contacts RDa releasing relay RIS and deenergizing solenoid SI. The elevators rest upon mechanical stops in their lower positions.

In addition to initiating downward motion of the elevators, the unlatching of relay LT also initiates the return motion of the cart 62 into the straight-line machine. Upon the release of relay LT, its contacts LTc are closed to unlatch mechanically latching relay LTR, contacts LNb having previously been closed upon the above-noted unlatching of relay LN. The resultant closure of contacts LTRd energizes relay RNS which closes its contacts RNSa and RNS*b* to energize solenoid SN. Since relay RR was released, as described, when cart 62 first moved from the machine, an operating circuit for relay RLS is also completed through contacts LTR*d*, LTR*c* and RR*c*. Relay RL energizes devent solenoid SL. Solenoids SN and SL control the hydraulic means for moving the cart 62, causing that means to commence inward or return motion of the cart at a slow speed. As the cart 62 moves inwardly, it clears limit switch LSQ2, permitting that limit switch to close its normally-closed contacts. Since limit switch LSQ1 has not yet been tripped, relay RQ is operated and closes its contacts RQ*a* to energize relay RMS. Relay RMS thereupon operates solenoid SM which, in conjunction with solenoids SL and SN, produces return motion of the cart 62 at the rapid travel rate. When cart 62 trips limit switch LSQ1, as it approaches its inboard position, relay RQ is released to release relay RMS and de-energize solenoid SM, and the rate of cart movement is accordingly reduced.

The cart 62 then continues to move inwardly until it reaches its inboard position, a condition signaled by the tripping of limit switch LSR which energizes relay RR to open its contacts RR*c*, releasing relay RLS. As a result, deventing solenoid SL is deenergized and inboard motion of the cart 62 terminates, the cart resting at the inboard limit mechanical stop but being subjected to a continuing mechanical pressure to maintain it in that position.

When the operation of relays RR and RD, as above described, concurs, so that contacts RR*c* and RD*c* are closed, the latching winding L of mechanically latching relay LI is energized to change the state of that relay, thereby changing the state of contacts LI*a* and LI*b* in preparation for the first timing period of the next work cycle.

As a result of the above-described operations, the workcarrier 22*b* at the pull-out station (FIG. 1) has been removed from the straight-line machine and is started on a course which, during succeeding work cycles, will result in motion of that workcarrier and its load from right to left along the track including rail 46 of the pull-out station (FIGS. 3A and 3B) where buffing or cleaning operations may be performed upon it and, during the progress of additional work cycles, will cause that workcarrier to be moved by the up elevator and the upper left-hand conveyor back to the cart 62 and returned, at its appropriate place in the sequence, to the straight-line plating machine. It will further be observed that while workcarrier 22*b* was removed from the straight-line machine, workcarrier 22*j* was moved into the straight-line machine in place of workcarrier 22*b* so that the pull-out station in no way interferes with the continuing operation of the straight-line machine.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In a workpiece-treating machine including a plurality of aligned workpiece-treating stations and workcarriers adapted to support workpieces, the combination of main conveyor means including a workcarrier-supporting track overlying the treating stations for moving said workcarrier along the line of treating stations, said track including a plurality of alignable sections including a movable intermediate section, a secondary conveyor spaced laterally of said main conveyor means for moving said workcarrier along a line different than said line of treating stations, and means for transporting said workcarrier from said main conveyor to said secondary conveyor comprising said intermediate section, track means extending laterally of said main conveyor means and of said secondary conveyor and extending therebetween, and wheeled support means supported by said track means and movable thereon and supporting said intermediate section.

2. In a workpiece-treating machine including a plurality of aligned workpiece-treating stations, and workcarriers adapted to support workpieces, the combination of main conveyor means including a workcarrier-supporting track overlying the treating stations for moving said workcarrier along the line of treating stations, said track including a plurality of alignable sections including a movable section, a secondary conveyor spaced laterally of said main conveyor means for moving said workcarrier along a line different than said line of treating stations, and means for transporting said carrier from a point on said main conveyor to said secondary conveyor and back to said point on said main conveyor comprising said movable section, track means extending laterally of said main conveyor means and of said secondary conveyor and extending therebetween, and wheeled support means supported by said track means and movable thereon and supporting said movable section.

3. In a workpiece-treating machine including a plurality of aligned workpiece-treating stations and workcarriers adapted to support workpieces, a combination of main conveyor means including a workcarrier-supporting track overlying the treating stations for moving said workcarrier along the line of treating stations, said track including a plurality of alignable sections, a secondary conveyor spaced laterally of said main conveyor means for moving said workcarrier along a line different than said line of treating stations, and means for transporting said carrier from a point on said main conveyor to said secondary conveyor and back to said point on said main conveyor comprising one of said sections, generally horizontal auxiliary track means extending laterally of said main conveyor means and of said secondary conveyor and between said conveyors and at a level below said track, and a wheeled carriage adapted to support said one of said track sections and to travel on said auxiliary track means.

4. In a workpiece-treating machine including a plurality of aligned workpiece-treating stations and workcarriers adapted to support workpieces, the combination of main conveyor means including a first workcarrier-supporting track overlying the treating stations for moving said workcarrier along the line of treating stations in one direction, said track including a plurality of alignable sections, secondary conveyor means disposed laterally on and generaly parallel with said main conveyor means and including a second workcarrier-supporting track generally parallelling said first track, means for moving one of said sections from alignment with others of said sections into alignment with said second track for transporting said workcarrier from a region on said main conveyor means to a region on said secondary conveyor means, said secondary conveyor means including first driving means for moving workcarriers in said direction along a predetermined course commencing at said region on said secondary conveyor means to a remote point and second driving means for moving workcarriers in said direction from a remote point to said region on said secondary conveyor, and means for moving said one of said sections from alignment with said second track into alignment with said others of said sections for transporting said workcarrier from said region on said secondary conveyor means back to said region on said main conveyor means.

5. The combination of claim 1 in which said secondary conveyor comprises a pair of overlying generally horizontal courses and elevator means at each end of said courses.

6. The combination of claim 1 in which said secondary conveyor comprises upper and lower courses, elevator means at one end of said upper and lower courses for transferring the workcarriers from said upper to said lower course, and elevator means at the other end of said upper and lower courses for transferring the workcarriers from said lower to said upper course.

7. The combination of claim 4 in which said first driving means moves the workcarriers in said direction from one point in said region on said secondary conveyor means and in which said second driving means moves the workcarriers in said direction past said one point and to a second point in said region on said secondary conveyor means which is spaced in said direction from said one point.

8. The combination of claim 7 further including pusher means for said main conveyor means for advancing workcarriers to a first point in said region on said main conveyor means and adapted to engage workcarriers at a second point in said region on said main conveyor means spaced in said direction from said one point on said main conveyor means by a distance substantially equal to the distance between said one and second points on said secondary conveyor means.

9. The combination of claim 7 in which said first driving means includes a chain trained about two sprockets and carrying pusher means engageable with the workcarrier at said one point on said secondary conveyor means and in which said second driving means includes a different chain trained about two different sprockets and carrying pusher means engageable with the workcarrier and disengaging the workcarrier by traveling around one of said different sprockets in a direction away from the workcarrier at said second point on said secondary conveyor means.

10. The combination of claim 9 in which one of said two sprockets of said first driving means is rotatable about substantially the same axis as one of said two different sprockets of said second driving means.

References Cited in the file of this patent
UNITED STATES PATENTS

| | | |
|---|---|---|
| 2,048,960 | Tiedemann | July 28, 1936 |
| 2,277,710 | Mertzanoff et al. | Mar. 31, 1942 |
| 2,645,186 | Davis | July 14, 1953 |
| 2,716,415 | Davis et al. | Aug. 30, 1955 |